US010664378B2

(12) United States Patent
Oka et al.

(10) Patent No.: US 10,664,378 B2
(45) Date of Patent: May 26, 2020

(54) VISUALIZING A USER-CENTRIC STACK FRAME GRAPH

(71) Applicant: INTERNATIONAL BUSINESS MACHINES CORPORATION, Armonk, NY (US)

(72) Inventors: Akio Oka, Tokyo (JP); Rina Nakazawa, Tokyo (JP); Hiroshi Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/014,707

(22) Filed: Jun. 21, 2018

(65) Prior Publication Data

US 2019/0391902 A1     Dec. 26, 2019

(51) Int. Cl.
*G06F 11/36* (2006.01)

(52) U.S. Cl.
CPC ...... *G06F 11/3608* (2013.01); *G06F 11/3664* (2013.01)

(58) Field of Classification Search
CPC .......................... G06F 11/3664; G06F 11/3608
See application file for complete search history.

(56) References Cited

U.S. PATENT DOCUMENTS

| | | | |
|---|---|---|---|
| 8,595,702 B2 | 11/2013 | Maybee et al. | |
| 9,064,037 B2 | 6/2015 | Basava et al. | |
| 9,612,945 B1 | 4/2017 | Booss et al. | |
| 2010/0235815 A1* | 9/2010 | Maybee | G06F 11/3636 717/125 |
| 2012/0260236 A1 | 10/2012 | Basak et al. | |
| 2018/0101466 A1* | 4/2018 | O'Dowd | G06F 11/3664 |
| 2018/0143894 A1* | 5/2018 | Singh | G06F 11/3636 |
| 2018/0357147 A1* | 12/2018 | Imon | G06F 11/3636 |

OTHER PUBLICATIONS

Altman et al., Performance Analysis of Idle Programs, ACM Sigplan Notices. vol. 45. No. 10. Oct. 17, 2010. pp. 739-753.
Arnold et al., "STAT: Stack Trace Analysis Tool", Lawrence Livermore National Laboratory. https://hpe.llnl.gov/pring/544. LLNL-WEB-670397. Downloaded Apr. 11, 2018. pp. 1-7.
Gregg et al., "The Flame Graph," AMC Queue. Communications of the ACM. vol. 59. No. 6. Jun. 2016. pp. 48-57.
Zhitnitsky et al., "Stackifier: Make Sense of Your Stack Trace", OverOps Blog. https://blog.takipi.com/stackifier-make-sense-of-your-stack-trace/. Aug. 24, 2015. pp. 1-6.

* cited by examiner

*Primary Examiner* — Wei Y Zhen
*Assistant Examiner* — Amir Soltanzadeh
(74) *Attorney, Agent, or Firm* — Tutunjian & Bitetto, P.C.; Vazken Alexanian

(57) ABSTRACT

A computer-implemented method is presented for visualizing a stack frame graph of software resources on a user interface of a computing device. The computer-implemented method includes determining a priority of each stack frame by employing a call stack analysis technique, selecting a most important frame from stack traces of a targeted application, and displaying, on the user interface, call stacks representing each frame.

11 Claims, 8 Drawing Sheets

VISUALIZING A USER-CENTRIC STACK FRAME GRAPH

BACKGROUND

Technical Field

The present invention relates generally to data processing systems, and more specifically, to visualizing a user-centric stack frame graph.

Description of the Related Art

Information visualization technology is a technology that converts data into graphics or images to be displayed on a screen and performs an interactive processing by employing computer graphics and image processing techniques. Generally, developers have tooling support to visualize information on a graphical user interface (GUI).

SUMMARY

In accordance with an embodiment, a method is provided for determining an important frame when the frame appears in different code paths. The method includes determining a priority of each stack frame by employing a call stack analysis technique, selecting a most important frame from stack traces of a targeted application, and displaying, on the user interface, call stacks representing each frame as a rectangle, placing the most important frame at a distinct location and placing each frame based on a position of the most important frame.

In accordance with another embodiment, a system is provided for determining an important frame when the frame appears in different code paths. The system includes a memory and one or more processors in communication with the memory configured to determine a priority of each stack frame by employing a call stack analysis technique, select a most important frame from stack traces of a targeted application, and display, on the user interface, call stacks representing each frame as a rectangle, placing the most important frame at a distinct location and placing each frame based on a position of the most important frame.

In accordance with yet another embodiment, a non-transitory computer-readable storage medium comprising a computer-readable program for determining an important frame when the frame appears in different code paths is presented. The non-transitory computer-readable storage medium performs the steps of determining a priority of each stack frame by employing a call stack analysis technique, selecting a most important frame from stack traces of a targeted application, and displaying, on the user interface, call stacks representing each frame as a rectangle, placing the most important frame at a distinct location and placing each frame based on a position of the most important frame.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for visualizing a user-centric stack frame graph. Analyzing software call stacks is a common and useful practice in software performance analysis. Here, the "software call stack" refers to a record of behavior of software during execution of the software and includes one or more stack frames, each frame denoting a sub-routine of an application program. A call path denotes an order of stack frames, that is, a calling order of methods in an application program. Developers usually browse and analyze software call stacks by means of a graphical user interface (GUI) that is capable of visualizing the software call stacks. The input of the software call stack visualization comes from the output of a system profiling tool. The profiling technique is developed for providing relevant information of programs upon practical execution. The profiling tool captures information of invocations (such as whether specific methods/functions are called, the number of times the specific methods/functions have been called, the relations between callers and callees, time cost in execution of the specific methods/functions, etc.) while the software is running and generates a data file as plain text output, such as a text file or a binary file. The profiling tool can assist users in analyzing and finding a bottleneck of software program execution and locating what is time-consuming, thereby ultimately realizing program optimization.

Embodiments in accordance with the present invention provide methods and devices for visualizing call stacks including frames that are time consuming by selecting the most important frame from stack traces of a targeted application, visualizing the stack trace that places the most important frame first (or topmost location or distinct location readily distinguishable), visualizing stacks of the other frames which call the important frame or are called from the important frame, highlighting the important frame, and when a user selects one of the frames, displaying the detail of all stacks which include the selected frame.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
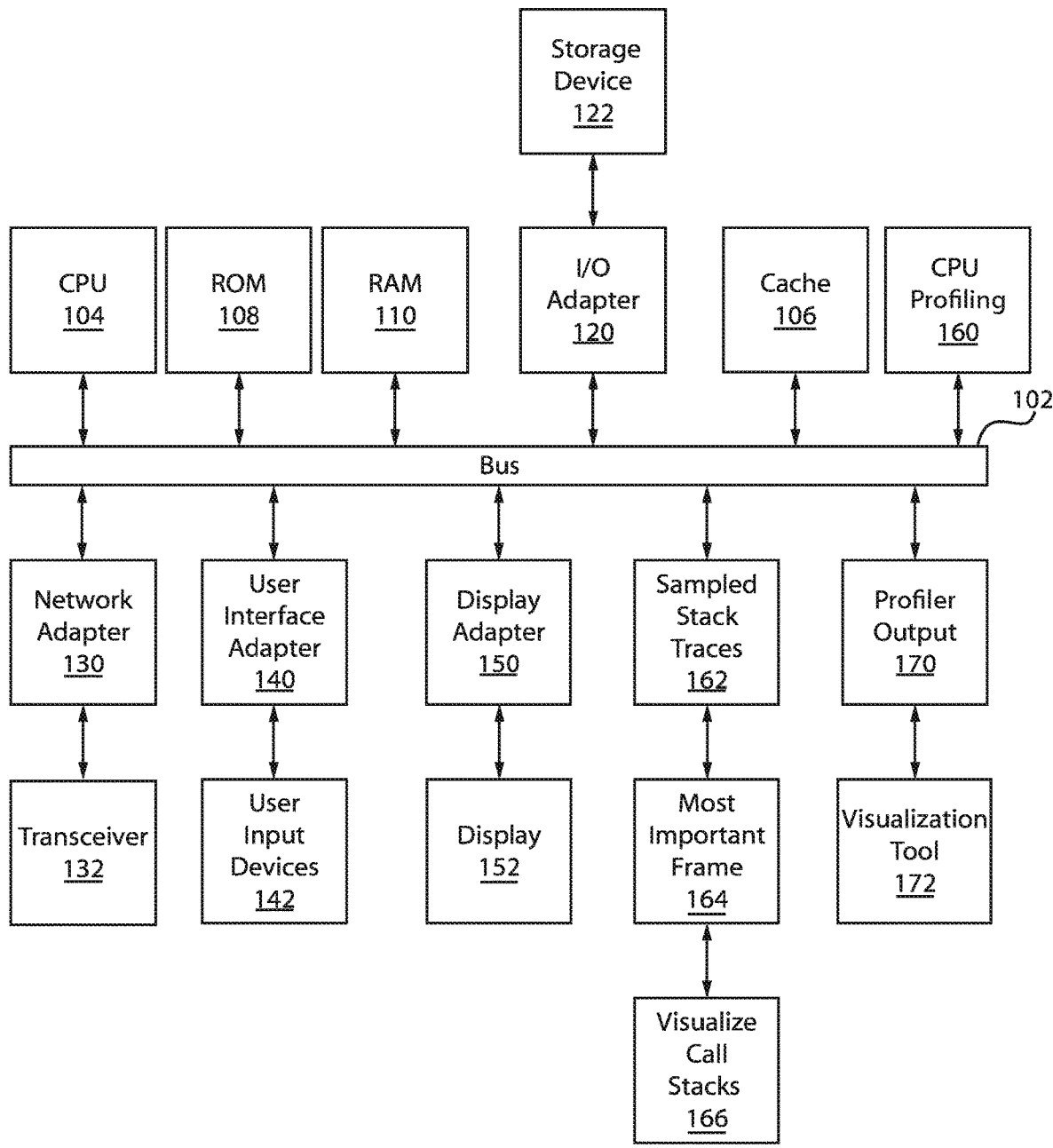
FIG. 1 is an exemplary processing system, in accordance with embodiments of the present invention.

FIG. 1 is an exemplary processing system, in accordance with embodiments of the present invention.

The processing system includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 102. Additionally, a CPU profiling 160 can be carried out in order to sample stack traces 162, determine the most important frame 164, and to visualize call stacks 166. Moreover, the CPU profiling 160 can result in profiler output 170 that is visualized by a visualization tool 172.

A storage device 122 is operatively coupled to system bus 102 by the I/O adapter 120. The storage device 122 can be any of a disk storage device (e.g., a magnetic or optical disk storage device), a solid state magnetic device, and so forth.

A transceiver 132 is operatively coupled to system bus 102 by network adapter 130.

User input devices 142 are operatively coupled to system bus 102 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 102 by display adapter 150.

Of course, the processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 2:
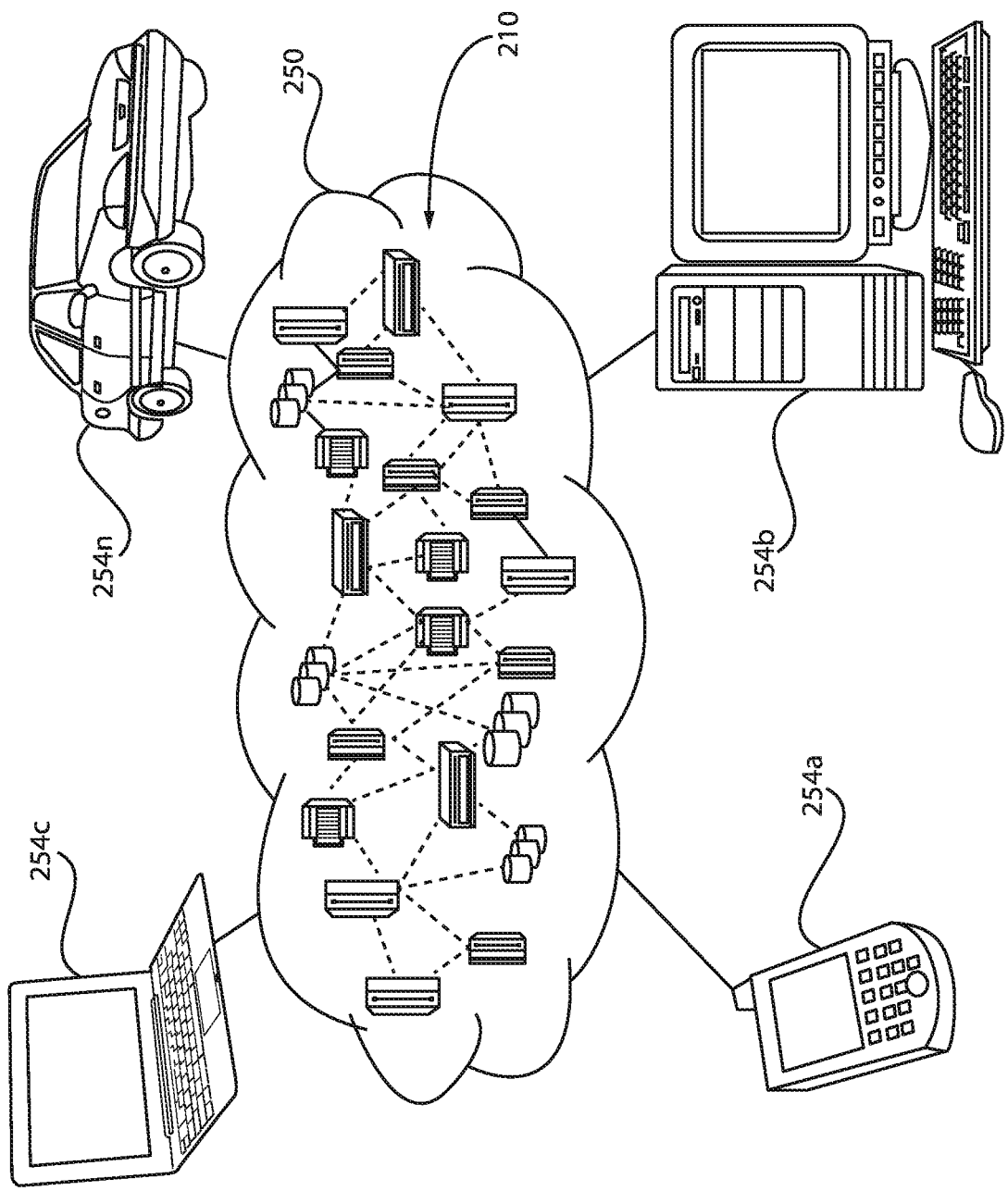
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
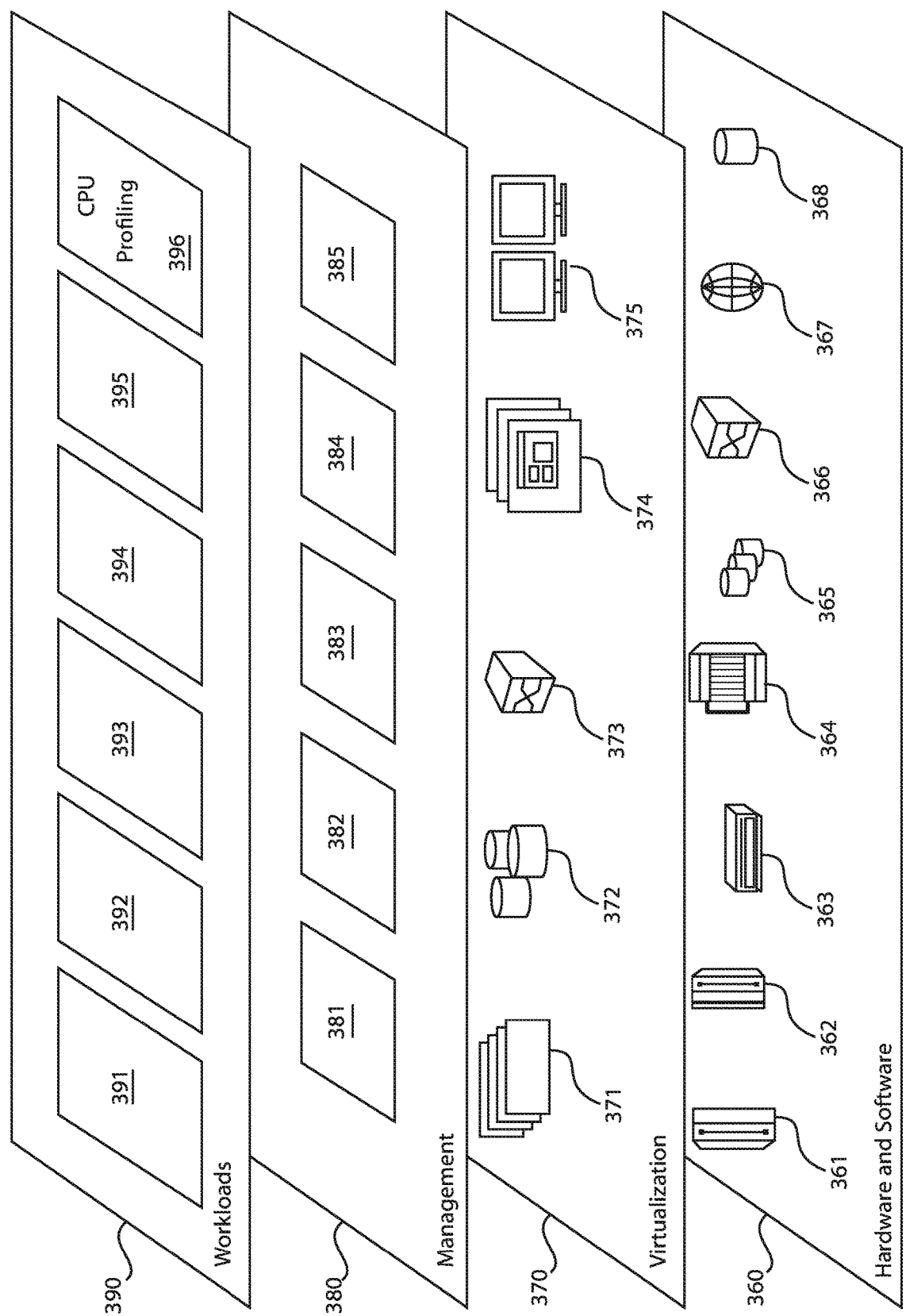
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and CPU profiling 396.

Figure 4:
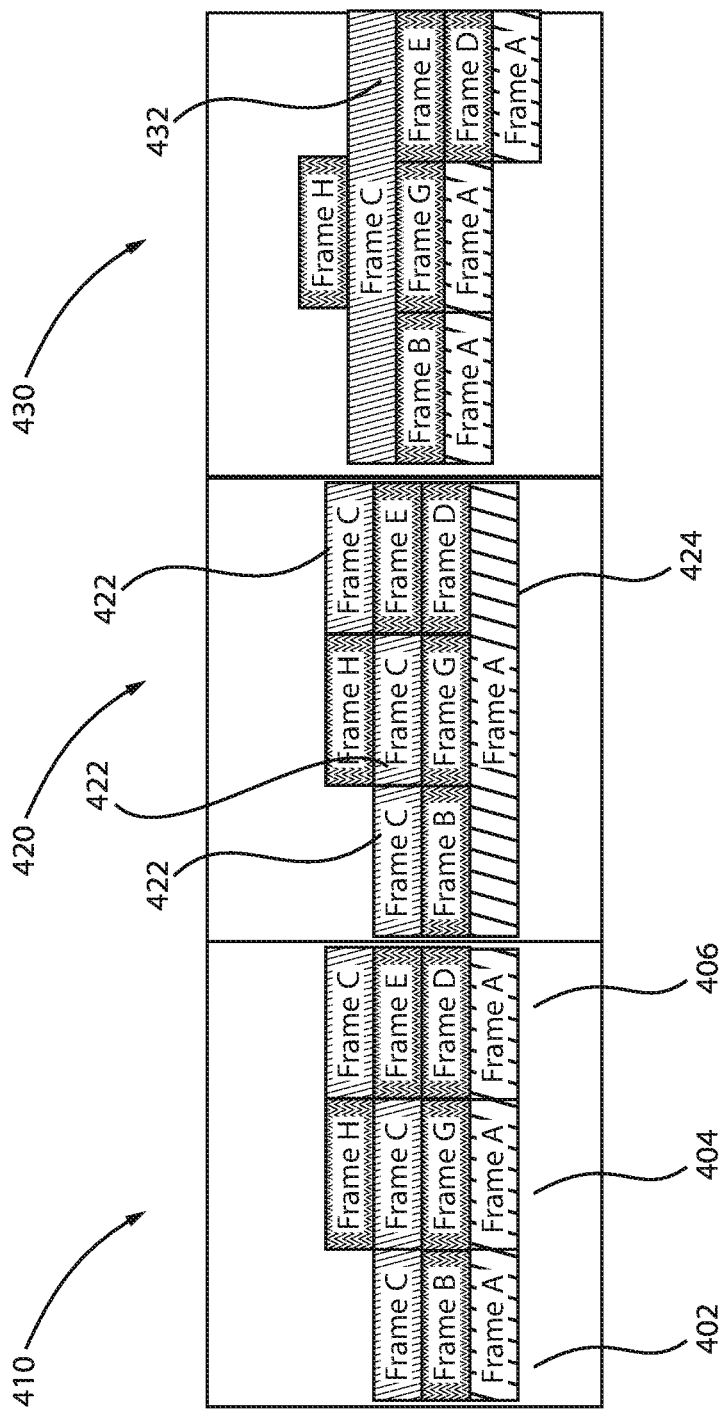
FIG. 4 is a block/flow diagram where the information of the most important frame is assembled into one location, in accordance with an embodiment of the present invention.

FIG. 4 is a block/flow diagram where the information of the most important frame is assembled into one location, in accordance with an embodiment of the present invention.

Existing software call stack visualization tools have the following drawbacks.

First, it is quite time-consuming to browse and locate a software call stack in the existing software call stack visualization. A software call stack has multifarious and disorderly information, and a huge amount of data. In the software call stack, there can be thousands of levels to be penetrated from a starting point of an application to a specific invocation. If the invocation reached is not an interesting invocation, the user needs to restart from another branch and penetrate. Such repetition is performed again and again, until locating performance issues. This can cause the users to browse a call stack in tens to hundreds of thousands of levels or even more.

Second, all information about the software is stacked in code level. The software call stack relates only to the software's behavior in code level. It cannot depict information about the software's design and the software's architecture at a high level, although such information can be of great help in analyzing software's performance.

The exemplary embodiments of the present invention solve these issues by visualizing call stacks by selecting the most important frame from stack traces of a targeted application, visualizing the stack trace that places the most important frame first, visualizing stacks of the other frames which call the important frame or are called from the important frame, highlighting the important frame, and when a user selects one of the frames, displaying the detail of all stacks which include the selected frame.

In FIG. 4, the diagram 410 depicts three call paths. A first call path 402, a second call path 404, and a third call path 406. The first call path 402 includes three frames, that is, Frame A, Frame B, and Frame C. The second call path 404 includes 4 frames, that is, Frame A, Frame G, Frame C, and Frame H. The third call path 406 includes 4 frames, that is, Frame A, Frame D, Frame E, and Frame C.

Diagram 420 illustrates a conventional technique for visualizing the call stacks 402, 404, 406 of diagram 410. For example, Frame A or frame 424 can be highlighted with a first color, e.g., intense red. In one instance, the border of frame 424 can be changed to the first color. Then the Frames C or frames 422 can be highlighted with a second color, e.g., yellow. In one instance, the border of frames 422 can be changed to the second color. As a result, each frame can be changed to different colors, the colors or intensity of the colors representing importance of the frame. However, the important Frame C is shown fragmented in different call path locations.

Diagram 430 illustrates the visualization technique of the present invention where it is determined that Frame C is the most important frame. Frames C of diagram 410 are combined or assembled into frame 432 in diagram 430 and moved or shifted to a top portion of the call-paths. Thus, the information of the most important frame is assembled and combined into one single frame, that single frame shifted to a different part of the code paths (e.g., a top portion or top-most portion or distinct location) where it will be more evident or visible to an end user.

Figure 5:
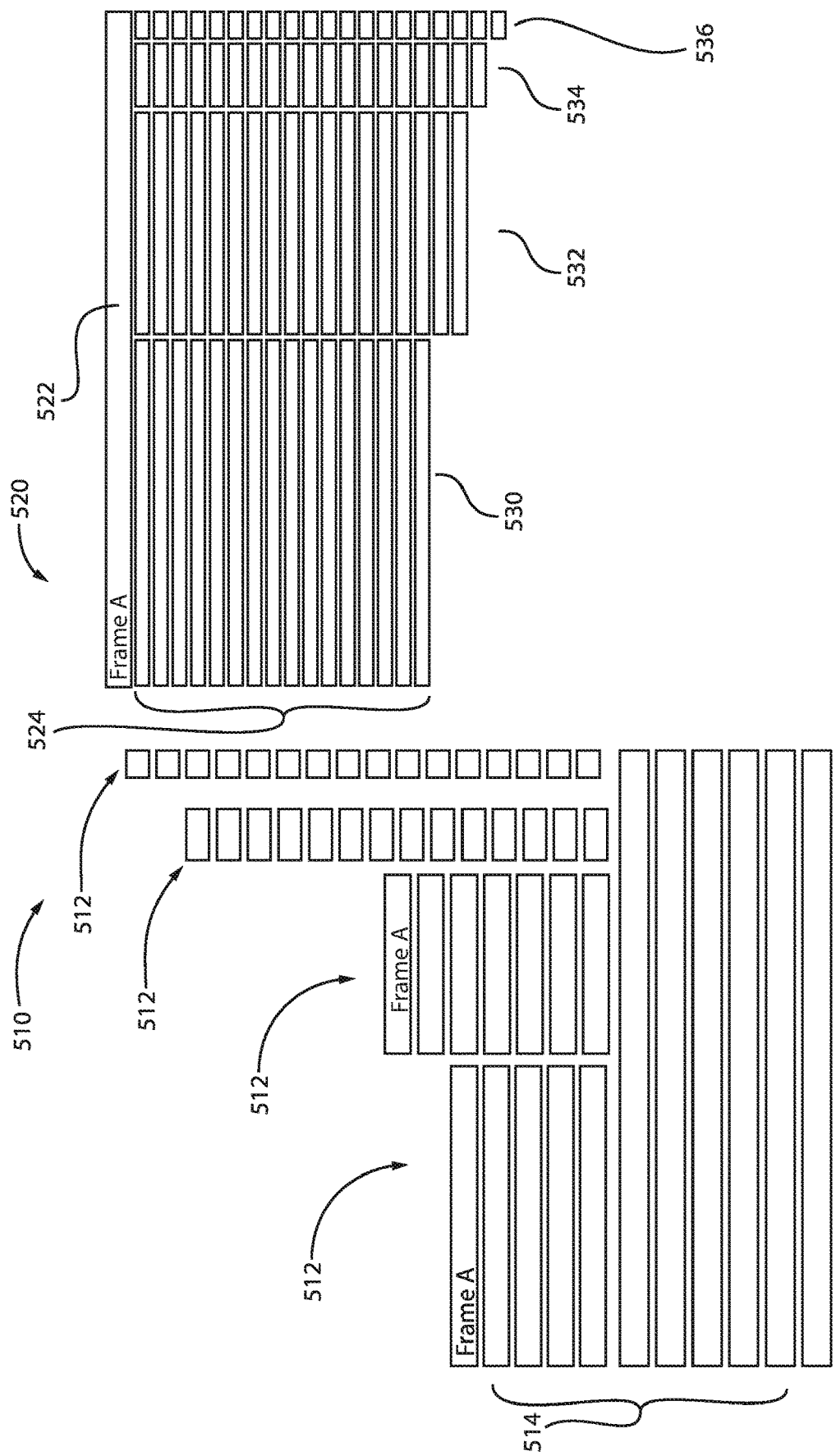
FIG. 5 is a block/flow diagram illustrating information of the most important frame being scattered (left side) and information of the most important frame being assembled into one location (right side), in accordance with an embodiment of the present invention.

FIG. 5 is a block/flow diagram illustrating information of the most important frame being scattered (left side) and information of the most important frame being assembled into one location (right side), in accordance with an embodiment of the present invention.

The diagram 510 illustrates information of the most important frame 512 (e.g., Frame A) being scattered in different code paths 514.

The diagram 520 illustrates the information of the most important frame 522 assembled and combined at a top-most portion of the call paths 524. The diagram 520 depicts, e.g., call stacks 530, 532, 534, 536. The most important frame 522 can have information in each of the call stacks 530, 532, 534, 536.

In the first step of the process, the most important frame is selected from stack traces of a targeted application.

The most important frame is a stack which is most likely to cause lack of software resource. The priority of each stack frame can be determined by employing a technique of analyzing call stacks, e.g., by employing a WAIT algorithm, which determines the activity category of each stack frame. WAIT is a tool for diagnosing the root cause of idle time in server applications. Given lightweight samples of Java® activity on a single tier, the WAIT tool can often pinpoint the primary bottleneck on a multi-tier system. The methodology centers on an informative abstraction of the states of idleness observed in a running program. This abstraction allows the tool to distinguish, for example, between hold-ups on a database machine, insufficient load, lock contention in application code, and a conventional bottleneck due to a hot method.

WAIT's methodology centers on Idle Time Analysis, that is, rather than analyze what an application is doing, the analysis focuses on explaining idle time. Specifically, the WAIT tool tries to determine the root cause that leads to under-utilized processors. Additionally, the WAIT tool must present information in a way that is easily consumable, and operate under restrictions of production deployment scenarios.

WAIT relies on samples of processor activity and of the state of threads in a Java® Virtual machine (JVM). The system usually takes samples from the hub process (e.g., application server) of a multi-tier application, but can also collect data from any standard Java® environment.

WAIT collects samples of processor utilization, process utilization, and snapshots of Java® activity using built-in mechanisms that are available on nearly every deployed Java® system.

In the second step of the process, the call stacks representing each frame are visualized as a rectangle, placing the most important frame first (or at a topmost location or distinct location readily distinguishable). The distinct location can be anywhere on the display space (top or bottom or middle). Then the other frames which call the important frame or are called from the important frame are stacked. The important frame can be highlighted, e.g., with a bold or dashed or dotted or colored line, or blinking.

Figure 6:
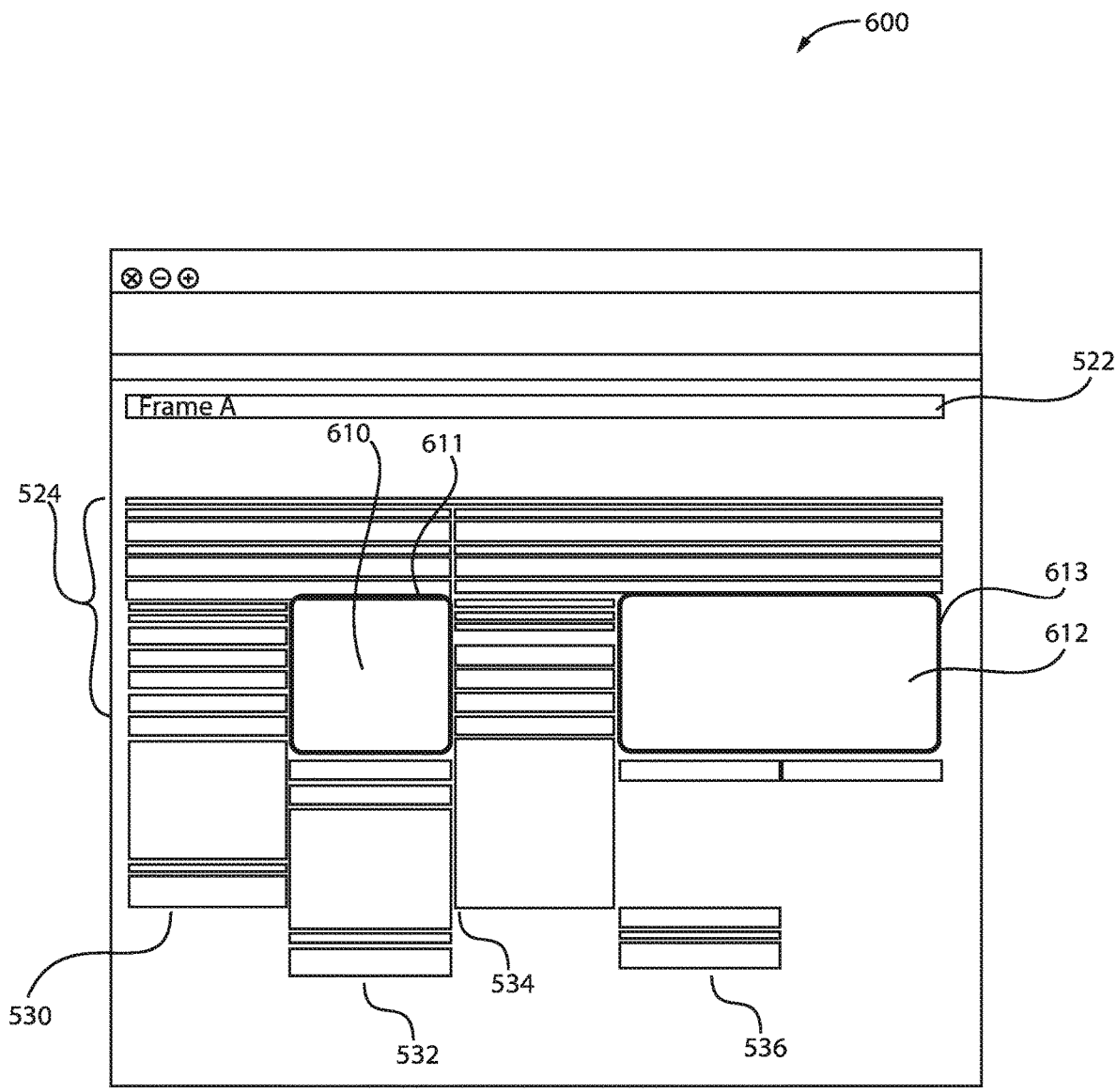
FIG. 6 is a block/flow diagram illustrating packaging of frames, except for the most important frame, in accordance with an embodiment of the present invention.

FIG. 6 is a block/flow diagram illustrating packaging of frames, except for the most important frame, in accordance with an embodiment of the present invention.

In the third step of the process, the frames, except the most important frame, are summarized by drawing larger chunks with their high-level concepts such as packages or classes. The chunks or frames can include the same call path or the same method when a user selects one of the chunks or the frames are highlighted. Additionally, by a user's interaction, the chunks are split into the frames.

The diagram 600 illustrates the most important frame 522 and call stacks 524. Various frames are combined into different packages or classes 610, 612. The package 610 can have a highlighted border 611 and the package 612 can have a highlighted border 613.

Figure 7:
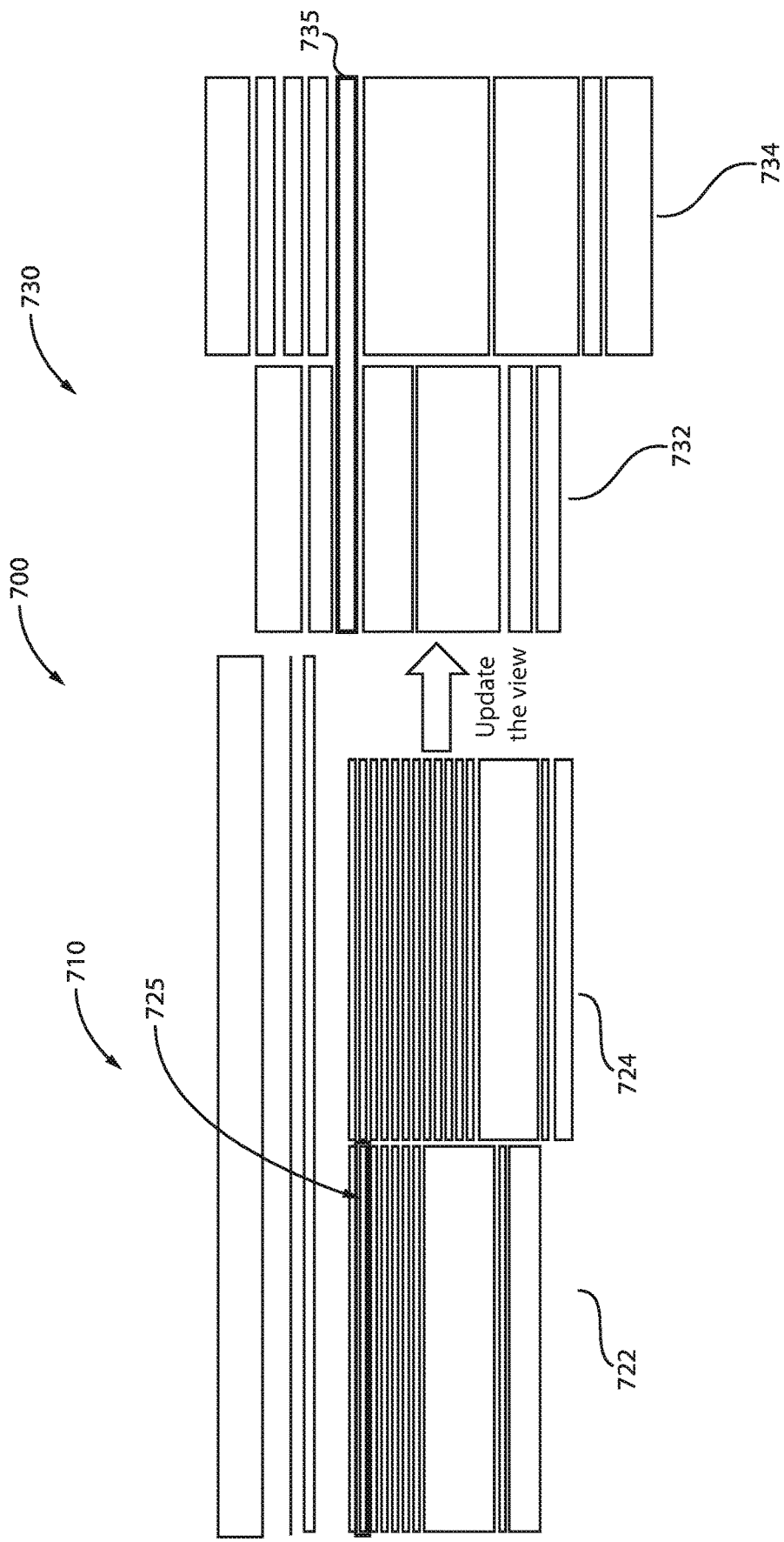
FIG. 7 is a block/flow diagram illustrating a user selecting one of the frames and pivoting the frame as the most important frame, in accordance with an embodiment of the present invention.

FIG. 7 is a block/flow diagram illustrating a user selecting one of the frames and pivoting the frame as the most important frame, in accordance with an embodiment of the present invention.

In the fourth step of the process, when a user selects one of the frames, the method pivots on the frame as the most important frame and updates the visualization result based on the selection.

This is accomplished by selecting a method which is the closest from the previous most important frame in the first step when there are multiple methods which are the same as the user-selected frame in the same call stack or selecting a method which has a similar pattern of callers and callees as that of the user-selected frame when there are multiple methods which are the same as the user-selected frame in the same call stack. If a call stack does not include the user-selected frame, the call stack is placed as another set of frames based on the previous important frame in the first step. A call stack which does not include the user-selected frame is placed next to the updated visualization result. Then, the detail of all the call stacks which include the frame in the other view are displayed.

Diagram 700 illustrates view 710 where the first step of the process has been implemented and illustrates view 730 where the fourth step of the process is implemented. In view 710, a user selects a frame 725 from the call stacks 722, 724.

In view 730, the current most important frame 735 is highlighted from call stacks 732, 734. When the user selects the frame 725, the details of all the stacks that include the frame are displayed and the most important frame is updated at frame 735.

Therefore, according to the process steps, it is easy to find a frame to focus on when the frame appears in different code paths because the method first attempts to visualize the stack trace that places the most important frame, which is most likely to cause a lack of software resource.

Figure 8:
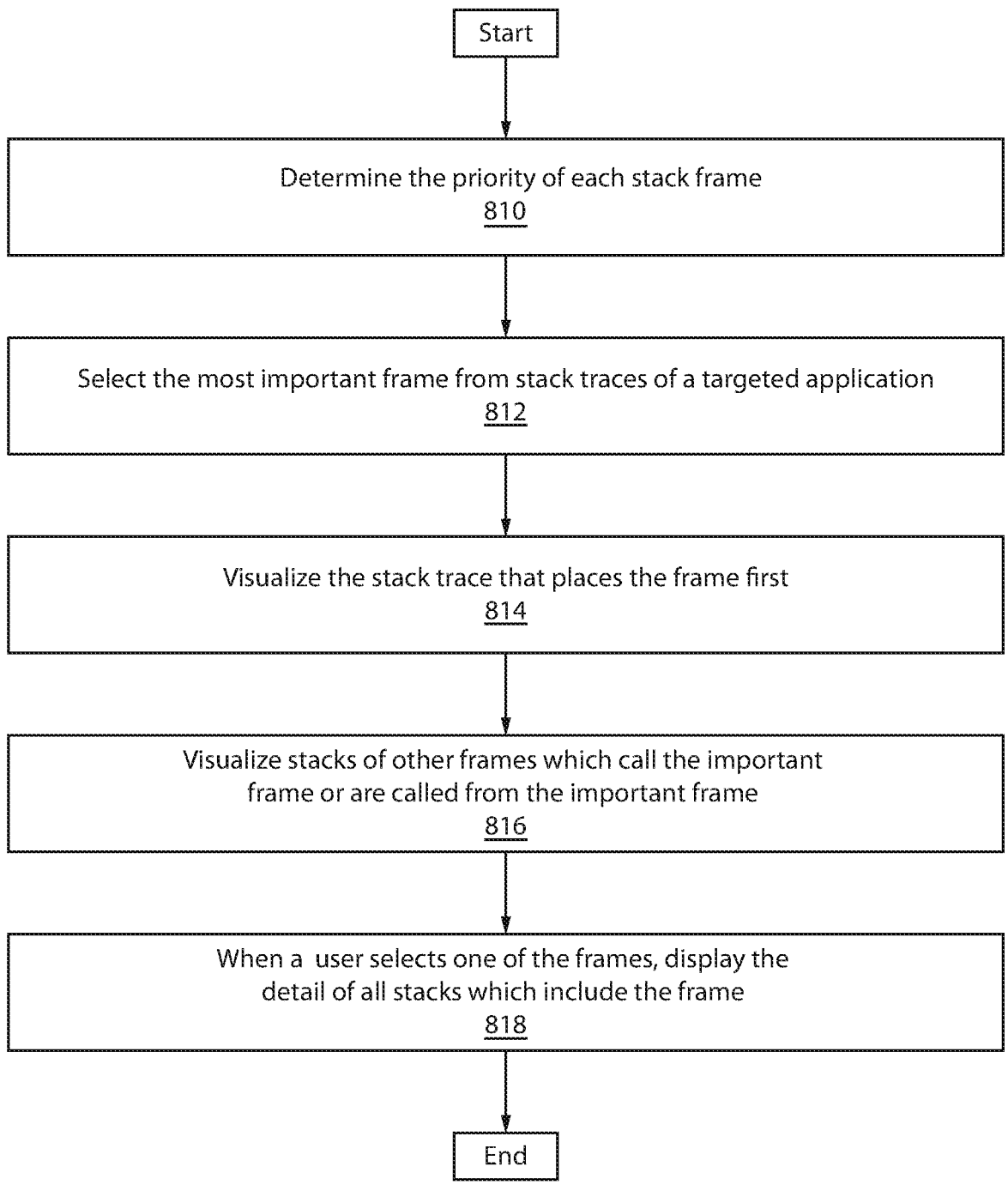
FIG. 8 is a block/flow diagram illustrating a method for visualizing a user-centric stack frame graph, in accordance with an embodiment of the present invention.

FIG. 8 is a block/flow diagram illustrating a method for visualizing a user-centric stack frame graph, in accordance with an embodiment of the present invention.

At block 810, determine the priority of each stack frame.

At block 812, select the most important frame from stack traces of a targeted application. The most important frame can be selected by employing, e.g., the WAIT tool. WAIT is a tool for diagnosing the root cause of idle time in server applications.

At block 814, visualize the stack trace that places the important frame first. The visualization can include representing each frame as a rectangle. The important frame can be highlighted by a plurality of different methods.

At block 816, visualize stacks of other frames which call the important frame or are called from the important frame. The frames are summarized, except for the most important frame, by classifying or packing frames having, e.g., the same call path.

At block 818, when a user selects one of the frames, display the detail of all stacks which include the frame. If a call stack does not include the user-selected frame, the call stack is placed as another set of frames based on the previous important frame. A call stack which does not include the user-selected frame is placed next to the updated visualization result. Then, the detail of all stacks which include the frame in the other view are displayed.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for visualizing a user-centric stack frame graph (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for visualizing a stack frame graph of software resources on a user interface of a computing device, the computer-implemented method comprising:
   determining a priority of each stack frame by employing a call stack analysis technique;
   selecting a most important frame from stack traces of a targeted application, the most important frame constructed by combining same frames from different call paths, and the most important frame defined as most likely to cause lack of software resources;
   displaying, on the user interface, call stacks representing each frame as a rectangle, shifting the most important frame to a top portion of all the call paths, and placing each frame based on a position of the most important frame;
   finding frames having a same call path by maintaining a structure of the call stacks;
   summarizing the frames into packages or classes; and
   if a user selects one of the frames, pivoting the user-selected frame as the most important frame and updating a visualization result.

2. The method of 1, further comprising selecting a frame which has a similar pattern of callers and callees as a new most important frame if there are multiple frames which are the same as the user-selected frame in a same call stack.

3. The method of claim 1, further comprising selecting a frame which is closest from a previous most important frame as the new most important frame if there are multiple frames which are the same as the user-selected frame in a same call stack.

4. The method of claim 1, further comprising, when the user selects one of the frames, displaying on the user interface details of all the call stacks which include the user-selected frame.

5. A non-transitory computer-readable storage medium comprising a computer-readable program executed on a processor in a data processing system for visualizing a stack frame graph of software resources on a user interface of a computing device, wherein the computer-readable program when executed on the processor causes a computer to perform the steps of:
   determining a priority of each stack frame by employing a call stack analysis technique;
   selecting a most important frame from stack traces of a targeted application, the most important frame constructed by combining same frames from different call paths, and the most important frame defined as most likely to cause lack of software resources;
   displaying, on the user interface, call stacks representing each frame as a rectangle, shifting the most important frame to a top portion of all the call paths, and placing each frame based on a position of the most important frame;
   finding frames having a same call path by maintaining a structure of the call stacks;
   summarizing the frames into packages or classes; and
   if a user selects one of the frames, pivoting the user-selected frame as the most important frame and updating a visualization result.

6. The non-transitory computer-readable storage medium of claim 5, wherein a frame is selected which has a similar pattern of callers and callees as a new most important frame if there are multiple frames which are the same as the user-selected frame in a same call stack.

7. The non-transitory computer-readable storage medium of claim 5, wherein a frame is selected which is closest from a previous most important frame as the new most important frame if there are multiple frames which are the same as the user-selected frame in a same call stack.

8. The non-transitory computer-readable storage medium of claim 5, wherein, when the user selects one of the frames, display on the user interface details of all the call stacks which include the user-selected frame.

9. A system for visualizing a stack frame graph of software resources on a user interface of a computing device, the system comprising:
   a memory; and
   one or more processors in communication with the memory configured to:
      determine a priority of each stack frame by employing a call stack analysis technique;
      select a most important frame from stack traces of a targeted application, the most important frame constructed by combining same frames from different call paths, and the most important frame defined as most likely to cause lack of software resources;
      display, on the user interface, call stacks representing each frame as a rectangle, shifting the most important frame to a top portion of all the call paths, and placing each frame based on a position of the most important frame;
      find frames having a same call path by maintaining a structure of the call stacks;
      summarize the frames into packages or classes; and
      if a user selects one of the frames, pivot the user-selected frame as the most important frame and update a visualization result.

10. The system of claim 9, wherein a frame is selected which has a similar pattern of callers and callees as a new most important frame if there are multiple frames which are the same as the user-selected frame in a same call stack.

11. The system of claim 9, wherein a frame is selected which is closest from a previous most important frame as the new most important frame if there are multiple frames which are the same as the user-selected frame in a same call stack.

* * * * *